United States Patent
Han et al.

(10) Patent No.: US 8,983,792 B2
(45) Date of Patent: Mar. 17, 2015

(54) INDOOR TESTING DEVICE FOR A PLURALITY OF ROTOR-CONTAINING FLYING OBJECTS

(75) Inventors: Jianda Han, Shenyang (CN); Yuqing He, Shenyang (CN); Feng Gu, Shenyang (CN); Zheng Wang, Shenyang (CN)

(73) Assignee: Shenyang Institute of Automation of the Chinese Academy of Sciences, Shenyang, Liaoning (CN)

( * ) Notice: Subject to any disclaimer, the term of this patent is extended or adjusted under 35 U.S.C. 154(b) by 542 days.

(21) Appl. No.: 13/157,286

(22) Filed: Jun. 9, 2011

(65) Prior Publication Data

US 2012/0221291 A1 Aug. 30, 2012

(30) Foreign Application Priority Data

Feb. 25, 2011 (CN) .......................... 2011 1 0045596

(51) Int. Cl.
*G01P 21/00* (2006.01)
*G06F 15/00* (2006.01)
*G01N 37/00* (2006.01)
*B64F 5/00* (2006.01)

(52) U.S. Cl.
CPC .................................. *B64F 5/0045* (2013.01)
USPC .......................... 702/145; 702/163; 73/865.9

(58) Field of Classification Search
USPC .............. 702/145, 150, 163; 73/865.8, 865.9; 248/163.1, 648, 652
See application file for complete search history.

(56) References Cited

U.S. PATENT DOCUMENTS

| | | | | | |
|---|---|---|---|---|---|
| 5,049,772 | A | * | 9/1991 | Mottier et al. | 310/233 |
| 6,141,466 | A | * | 10/2000 | Shigehara | 385/22 |
| 6,188,187 | B1 | * | 2/2001 | Harlan | 318/400.04 |
| 6,304,376 | B1 | * | 10/2001 | Baun et al. | 359/429 |
| 6,539,333 | B1 | * | 3/2003 | Metelski | 702/173 |
| 6,885,924 | B2 | * | 4/2005 | Ford et al. | 701/36 |
| 8,281,811 | B2 | * | 10/2012 | Rau et al. | 137/615 |
| 8,353,199 | B1 | * | 1/2013 | Ma et al. | 73/65.05 |
| 2008/0033684 | A1 | * | 2/2008 | Vian et al. | 702/113 |

* cited by examiner

*Primary Examiner* — Michael Nghiem
*Assistant Examiner* — Alexander Satanovsky
(74) *Attorney, Agent, or Firm* — Novick, Kim & Lee, PLLC; Allen Xue

(57) ABSTRACT

An indoor testing device for multiple rotor-containing flying objects including a main support having a plurality of linking members, a plurality of mechanical arms, a plurality of trays, and control units of the mechanical arms. The main support is disposed vertically. The mechanical arms are separately disposed on the linking members of the main support with different height. The trays are separately disposed on one end of the mechanical arms for receiving rotor-containing flying objects, and the control units are disposed on the mechanical arms and rotate therewith. The device can be used for the cooperation and coordination test of multiple rotor-containing flying objects and autonomous control experiments of a single rotor-containing flying object. The tests have high stimulation and improve the usability of the experimental results in the actual system.

10 Claims, 2 Drawing Sheets

INDOOR TESTING DEVICE FOR A PLURALITY OF ROTOR-CONTAINING FLYING OBJECTS

CROSS-REFERENCE TO RELATED APPLICATIONS

Pursuant to 35 U.S.C. §119 and the Paris Convention Treaty, this application claims the benefit of Chinese Patent Application No. 201110045596.3 filed Feb. 25, 2011, the contents of which are incorporated herein by reference.

BACKGROUND OF THE INVENTION

1. Field of the Invention

The invention relates to a testing device for testing the performance of a plurality of simultaneously-flying objects, and more particularly to an indoor testing device for multiple rotor-containing flying objects.

2. Description of the Related Art

Flying objects (e.g., robots, drones, helicopters, etc., manned or unmanned) with rotors have excellent mobility even in a limited space and thus can fulfill complicated missions that cannot be achieved by conventional aircrafts. If a plurality of rotor-containing flying objects is combined to fulfill missions cooperatively, the objectives can be achieved with high efficiency and high reliability. However, because existing test conditions for multiple rotor-containing flying objects exhibit high cost and risk, the coordination of a plurality of rotor-containing flying objects is very difficult to put into practice. Therefore, it is urgent to develop an indoor testing device for multiple rotor-containing flying objects with lost cost and low risk.

SUMMARY OF THE INVENTION

In view of the above-described problems, it is one objective of the invention to provide an indoor testing device for multiple rotor-containing flying objects with lost cost and low risks.

To achieve the above objectives, in accordance with one embodiment of the invention, there is provided an indoor testing device for multiple rotor-containing flying objects, comprising a main support comprising a plurality of linking members, a plurality of mechanical arms, a plurality of trays, and control units of the mechanical arms, wherein the main support is disposed vertically, the mechanical arms are separately disposed on the linking members of the main support with different height, the trays are separately disposed on one end of the mechanical arms for receiving rotor-containing flying objects, and the control units are disposed on the mechanical arms and rotate therewith.

In a class of this embodiment, the main support further comprises a base, and the linking members are mounted on the base coaxially.

In a class of this embodiment, each of the mechanical arms comprises three rotary joints, i.e., a horizontal rotary joint, a pitching rotary joint, and a tray rotary joint; the horizontal rotary joint is disposed on a corresponding linking member coaxially; the pitching rotary joint is orthogonal with the horizontal rotary joint; and the tray rotary joint is disposed on the tray coaxially and rotates horizontally.

In a class of this embodiment, an adjustable balance weight is disposed on the mechanical arm at the opposite end of the tray.

In a class of this embodiment, each of the control units comprises a photoelectric switch, an encoder, an onboard controller, and a platform information processor; the photoelectric switch detects the rotational speed of the rotor of the flying object and sends the data to the onboard controller; the onboard controller outputs PWM control signals to the rotor-containing flying object; the encoder collects the position/speed signals of the rotor-containing flying object and send them to the platform information processor for processing, and the platform information processor cooperates with the onboard controller via communication connection.

In a class of this embodiment, a photocoupler is disposed between the photoelectric switch and the onboard controller.

In a class of this embodiment, the encoders are disposed on the horizontal rotary joint, the pitching rotary joint, and the tray rotary joint, respectively.

In a class of this embodiment, a commutator brush is disposed on the horizontal rotary joint and the tray rotary joint separately.

In a class of this embodiment, each of the control units further comprises a zero level sensor; the sensor is disposed in the position of the horizontal rotary joint; and the signals of the zero level sensor are transmitted to the platform information processor.

In a class of this embodiment, the control units of the mechanical arms are communication connected to a ground control system via buses.

Advantages of the invention are summarized below.

1. The main structure of the device of the invention is a test platform comprising three telescopic mechanical arms. Each of the three mechanical arms has three independent degrees of freedom. The platform itself has no power equipment, and each mechanical arm moves with the drive of a rotor-containing flying object. The cooperation and coordination experiments of a plurality of rotor plying objects can be carried out on the platform. In addition, the platform can be used for autonomous control experiments of a single rotor-containing flying object.

2. The rotor-containing flying object is fixed on the end of the mechanical arm and drives the mechanical arm to move, and meanwhile aerodynamic is produced due to the flying of the rotor-containing flying object. The test need not modify the structure of the object, so the dynamic characteristics of the object are simulated to the greatest extent, thereby improving the usability of the experimental results in the actual system.

3. The device supports the vertical formation test of rotor-containing flying objects with high security, which benefits the study of the feasibility as well as the aerodynamic characteristics of the rotor-containing flying objects of vertical formation.

4. The bus communication structure of the invention supports the cable communications between the flying objects and between the object and the main controller. Meanwhile, each object comprises a single chip microcomputer, DSP, which is beneficial to install a wireless communication module to achieve the wireless communications between the flying objects and between the object and the main controller.

5. Each mechanical arm is disposed with a balance weight, which reduces the load of the rotor-containing flying object and can support the test of different types of rotor-containing flying objects.

6. The mechanical arm is disposed with high-precision encoders, which ensures the accurate orientation of the flying objects and is conducive to performing high-difficulty and high-accuracy test.

7. The device is designed using modular design concept and thus is easy to assemble.

DETAILED DESCRIPTION OF THE EMBODIMENTS

An indoor testing device for multiple rotor-containing flying objects comprises a main support comprising a plurality of linking members, a plurality of mechanical arms, a plurality of trays, and control units of the mechanical arms, wherein the main support is disposed vertically, the mechanical arms are separately disposed on the linking members of the main support with different heights, the trays are separately disposed on one end of the mechanical arms for receiving rotor-containing flying objects, and the control units are disposed on the mechanical arms and rotate therewith.

Figure 1:
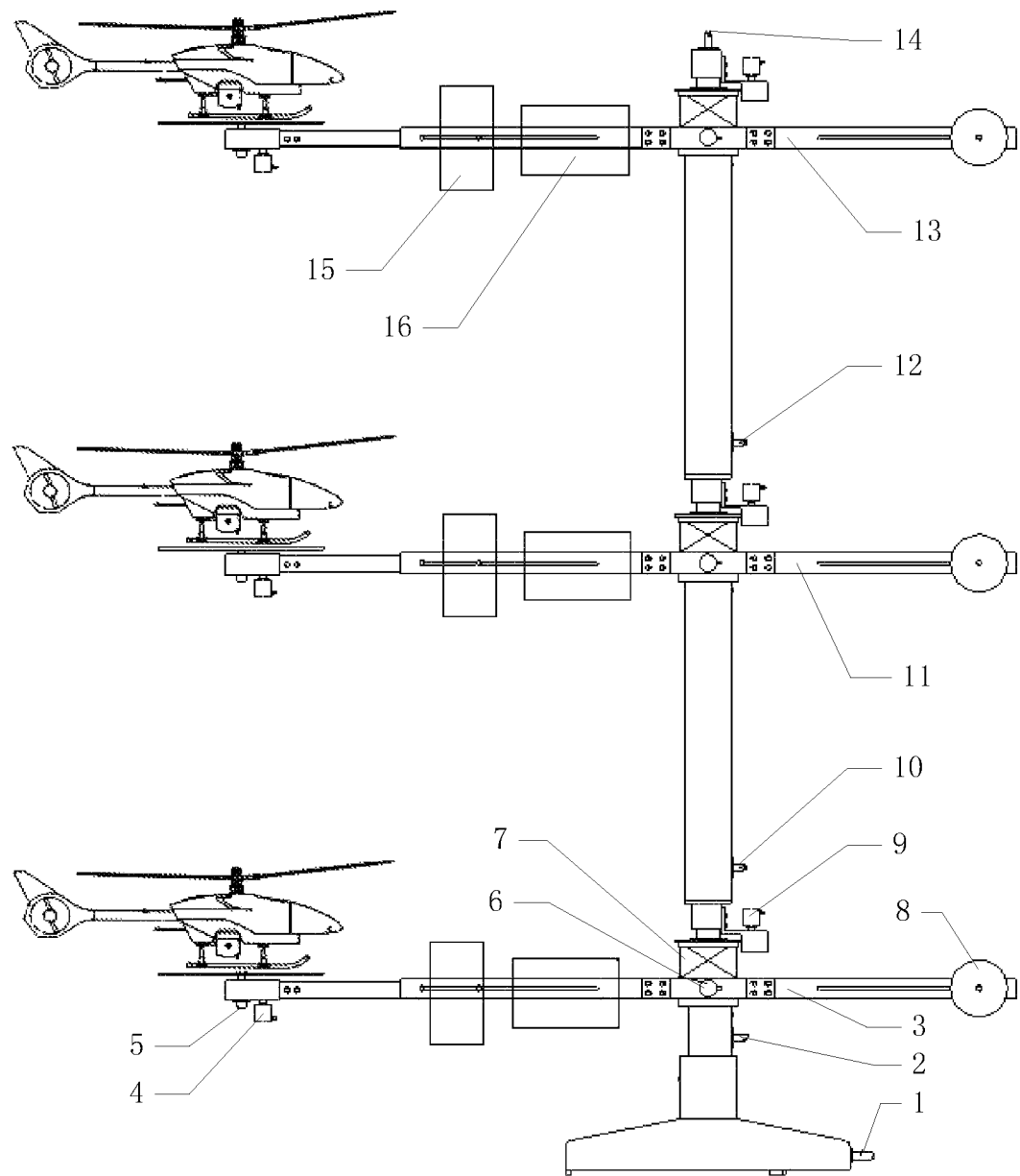
FIG. 1 is a schematic diagram of an indoor testing device for multiple rotor-containing flying objects according to one embodiment of the invention.

The main support further comprises a base, and the linking members are mounted on the base coaxially. The linking members are between 2 and 6 in number. In this embodiment, the linking member is three, as shown in FIG. 1, and the main support comprises three detachable linking members and a base. The three linking members receive three mechanical arms 3, 11, 13, respectively. Each mechanical arm comprises three rotary joints, i.e., a horizontal rotary joint, a pitching rotary joint, and a tray rotary joint. A commutator brush is disposed on the horizontal rotary joint and the tray rotary joint separately, i.e., as shown in FIG. 1, a horizontal commutator brush 5 and a tray commutator brush 7, which benefits the circuit connection. An encoder is disposed on the horizontal rotary joint, the pitching rotary joint, and the tray rotary joint, separately, to detect the motion state (position, speed, etc.) of the joints.

The horizontal rotary joint is disposed on a corresponding linking member coaxially; the pitching rotary joint is orthogonal with the horizontal rotary joint; and the tray rotary joint is disposed on the tray coaxially and rotates horizontally.

An adjustable balance weight 8 is disposed on the mechanical arm at the opposite end of the tray, to adjust the moving load of the multiple rotor-containing flying objects.

Figure 2:
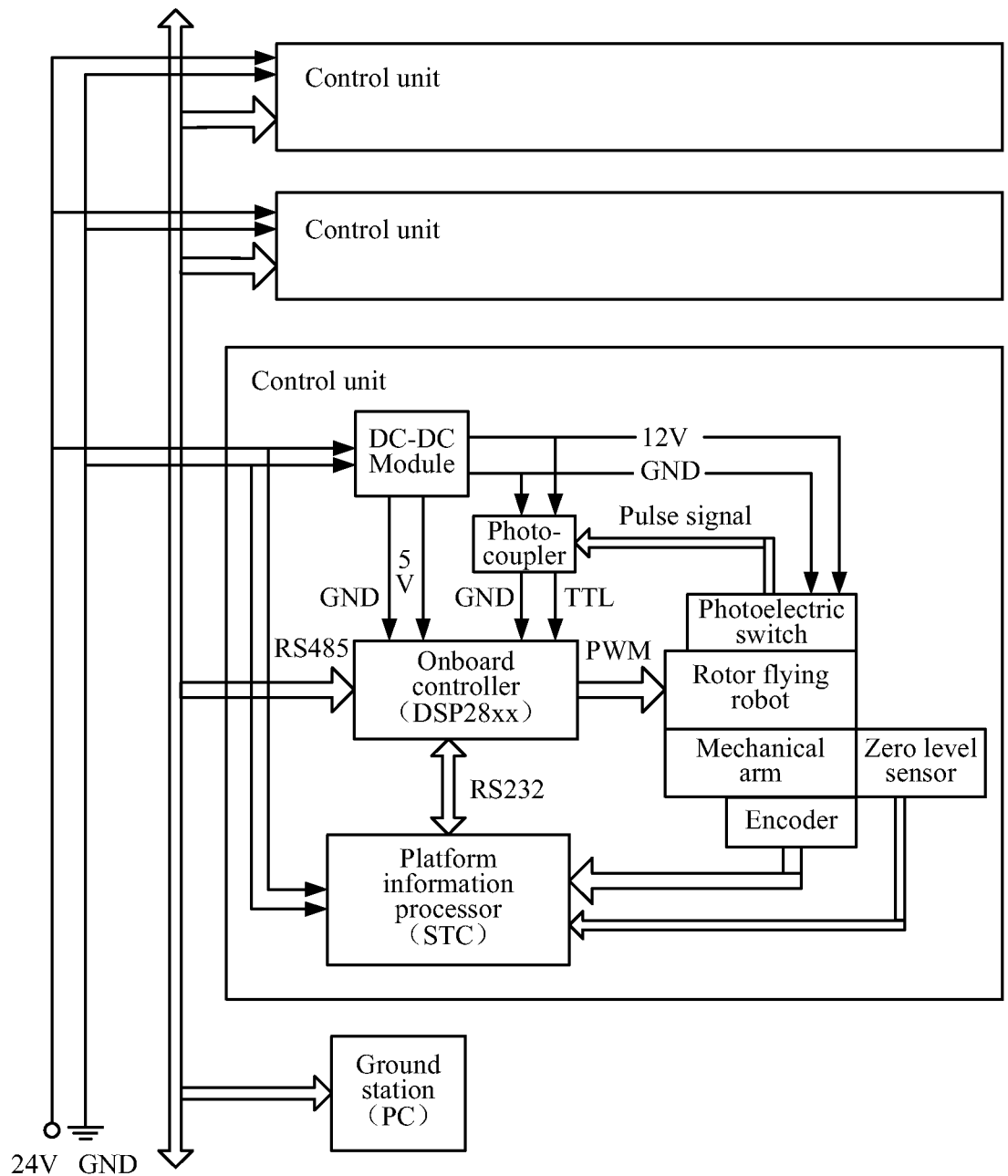
FIG. 2 is a circuit diagram of a control unit according to one embodiment of the invention.

As shown in FIG. 2, there provided is three control units disposed on three mechanical arms, respectively, and moving with the mechanical arms. Each of the control units comprises a photoelectric switch, an encoder, an onboard controller 15, and a platform information processor 16; the photoelectric switch detects the rotational speed of the rotor of the flying object and sends the data to the input end of the onboard controller 15; the onboard controller 15 outputs PWM control signal to the rotor-containing flying object; the encoder collects the position/speed signals of the rotor-containing flying object and send them to the platform information processor 16 for processing, and the platform information processor 16 cooperates with the onboard controller 15 via communication connection.

The encoders are disposed on the horizontal rotary joint, the pitching rotary joint, and the tray rotary joint, respectively, as shown in FIG. 1, a horizontal rotary encoder 9, a pitching rotary encoder 6, and a tray rotary encoder 4.

Each of the control units further comprises a zero level sensor; the sensor is disposed in the position of the horizontal rotary joint. The signals of the zero level sensor are transmitted to the platform information processor 16, to detect the horizontal initial position of the rotor-containing flying objects.

The main control unit of the onboard controller 15 is a digital signal processor which processes digital signals of the rotor-containing flying objects. The main control unit of the platform information processor 16 is a single chip microcomputer which collects state data of the mechanical arm (for example, the measurement of location information of each joint angle). The two main control units communicate with each other via serial interface. A power cable 1 enters the device via the base. The three control units communicate with a ground computer system via buses 2, 10, 12, and 14, to carry out the test of multiple rotor-containing flying objects.

The test principle and process is summarized below. Three rotor-containing flying objects are fixed on the trays of the mechanical arms, respectively. Thus, each mechanical arm is driven by a single rotor-containing flying object to move with three degrees of freedom. The onboard controller 15 controls the motion of the rotor-containing flying object. The platform information processor 16 collects state data of the mechanical arm. The testing device of this embodiment can support three rotor-containing flying objects. Thus, the following tests can be carried out:

1. To study systemic control of a single rotor-containing flying object, the tests comprise rigid body dynamics modeling of a rotor-containing flying object, aerodynamic modeling, ground effect modeling, autonomous control of a rotor-containing flying object, and so on.

2. To study the cooperation and coordination of multiple rotor-containing flying objects, the test comprise the formation control of multiple rotor-containing flying objects, cooperative environment modeling of multiple rotor-containing flying objects, attitude synchronization of multiple rotor-containing flying objects, air-ground cooperation of objects, and so on.

The invention claimed is:

1. A testing device for testing a plurality of rotor-containing flying objects, comprising:
    a main support comprising a plurality of linking members, wherein each of the linking members forms a section of the main support;
    a plurality of mechanical arms, wherein each of the mechanical arms has a first end and a second end, and wherein the mechanical arm is rotatably disposed on the main support;
    a plurality of trays, wherein each of the trays is disposed at the first end of a corresponding mechanical arm and is adapted to receive a rotor-containing flying object; and
    a plurality of control units for controlling the rotor-containing flying objects, wherein each of said control units is disposed on a corresponding mechanical arm, and
    when the plurality of rotor-containing flying objects are being tested, each of the flying object is affixed to a corresponding mechanical arm at its tray so that the mechanical arm is driven by the flying force of the flying object in three degrees of freedom.

2. The device of claim 1, wherein said main support further comprises a base, and said linking members are mounted on said base.

3. The device of claim 1, wherein each of said mechanical arms comprises a horizontal rotary joint, a pitching rotary joint, and a tray rotary joint;
    said horizontal rotary joint is disposed about a corresponding linking member; and said pitching rotary joint is orthogonal to said horizontal rotary joint;

said tray rotary joint is disposed on said tray coaxially and rotates horizontally.

4. The device of claim 1, further comprising an adjustable counterweight disposed at the second end of said mechanical arm, wherein the adjustable counterweight can be adjusted to balance the weight of the rotor-containing flying object at the first end.

5. The device of claim 1, wherein each of said control units comprises a photoelectric switch, an encoder, an onboard controller, and a platform information processor;

said photoelectric switch detects the rotational speed of the rotor of said rotor-containing flying object and sends the data to the input end of said onboard controller;

said onboard controller outputs coordinated PWM control signals to control the rotor-containing flying object;

said encoder collects position signals and speed signals of said rotor-containing flying object and send the signals to said platform information processor for processing; and said platform information processor collects a state data of the mechanical arms and communicates with said onboard controller via a communication connection.

6. The device of claim 5, wherein a photocoupler is disposed between said photoelectric switch and said onboard controller.

7. The device of claim 5, wherein each of said horizontal rotary joint, said pitching rotary joint, and said tray rotary joint has an encoder disposed thereon.

8. The device of claim 7, wherein each of said horizontal rotary joint and said tray rotary joint has a commutator brush disposed thereon.

9. The device of claim 5, wherein each of said control units further comprises a zero level sensor for recording an initial position of the rotor-containing object in the horizontal direction; said sensor is disposed on a horizontal rotary joint; and the signals of said zero level sensor are transmitted to said platform information processor.

10. The device of claim 5, wherein said control units are connected to a ground control system via buses.

* * * * *